United States Patent
Dumont et al.

(10) Patent No.: US 12,035,706 B2
(45) Date of Patent: Jul. 16, 2024

(54) SPRAY BOOM HEIGHT CONTROL SYSTEM

(71) Applicant: AGCO International GmbH, Neuhausen (CH)

(72) Inventors: Robert Jozef Dumont, Grubbenvorst (NL); Guill Roefs, Grubbenvorst (NL)

(73) Assignee: AGCO International GmbH, Neuhausen (CH)

( * ) Notice: Subject to any disclaimer, the term of this patent is extended or adjusted under 35 U.S.C. 154(b) by 311 days.

(21) Appl. No.: 17/755,800

(22) PCT Filed: Oct. 16, 2020

(86) PCT No.: PCT/IB2020/059747
§ 371 (c)(1),
(2) Date: May 9, 2022

(87) PCT Pub. No.: WO2021/090093
PCT Pub. Date: May 14, 2021

(65) Prior Publication Data
US 2022/0386588 A1    Dec. 8, 2022

(30) Foreign Application Priority Data

Nov. 8, 2019  (GB) ..................................... 1916252
Nov. 8, 2019  (GB) ..................................... 1916254

(51) Int. Cl.
*A01M 7/00*      (2006.01)
*A01C 23/00*     (2006.01)
(52) U.S. Cl.
CPC ......... *A01M 7/0057* (2013.01); *A01C 23/008* (2013.01)

(58) Field of Classification Search
CPC .......................... A01M 7/0057; A01C 23/008
See application file for complete search history.

(56) References Cited

U.S. PATENT DOCUMENTS

| | | | |
|---|---|---|---|
| 2011/0153168 A1* | 6/2011 | Peterson | A01B 79/005 701/50 |
| 2014/0074360 A1 | 3/2014 | Rosa et al. | |
| 2016/0255769 A1 | 9/2016 | Leeb | |
| 2019/0176559 A1 | 6/2019 | Bittner et al. | |
| 2019/0176560 A1 | 6/2019 | Bittner et al. | |

FOREIGN PATENT DOCUMENTS

GB          2521343 A1     6/2015

OTHER PUBLICATIONS

UK Intellectual Property Office, Search report for priority Application No. GB1916252.8, dated May 12, 2020.
European Patent Office, Search Report for related International Application No. PCT/IB2020/059747, mail date Feb. 1, 2021.

* cited by examiner

*Primary Examiner* — Yuen Wong

(57) ABSTRACT

A boom height control system for an agricultural crop sprayer includes a spray boom and an actuator arranged to adjust a position of at least a portion of the spray boom in response to a position adjustment command. A speed sensor is provided to measure a forward speed of the sprayer and generate a speed value. A position sensor is provided to measure a current position of the spray boom portion and generate a current position value. A controller is in communication with the speed sensor, the position sensor and the actuator. The controller is configured to generate the position adjustment command based upon a target position value, a current position value and a speed value.

18 Claims, 5 Drawing Sheets

SPRAY BOOM HEIGHT CONTROL SYSTEM

CROSS-REFERENCE TO RELATED APPLICATIONS

This application is a national phase entry under 35 U.S.C. § 371 of International Patent Application PCT/IB2020/059747, filed Oct. 16, 2020, designating the United States of America and published in English as International Patent Publication WO 2021/090093 A1 on May 14, 2021, which claims the benefit of and priority from United Kingdom Application Nos. 1916252.8 and 1916254.4, each filed Nov. 8, 2019, the entire disclosure of each of which is hereby incorporated by reference.

FIELD

The disclosure relates to agricultural crop sprayers and particularly to the control of booms fitted to such sprayers, wherein the height of the boom above a target is controlled during a field operation

BACKGROUND

Agricultural sprayers are used by farmers and contractors to apply pesticides and other nutrient-containing solutions to crop fields. Sprayers can be mounted to, or towed by, a tractor or other suitable vehicle or may be self-propelled with an integrated means of propulsion and a driver's cab. The sprayer machine typically includes a storage tank for the liquid to be applied, the tank being filled as required by the operator. Alternatively, in systems which offer lower ground pressure, the sprayer machine may be semi-permanently connected by a pipe to a local (field-based) bowser wherein the applied liquid is supplied via a pipe from the bowser to the sprayer continuously as the latter is repeatedly moved across the crop field.

The liquid is applied to the field by a number of discharge devices which are mounted in a spaced relationship along the length of a boom which, itself, is mounted to the sprayer vehicle. The discharge devices are each connected to the storage tank by a fluid delivery network comprising various pipes, valves, pumps, and other plumbing and comprise at least one nozzle. The liquid is typically atomized by the nozzle and applied to the crop in a jet of mist for example.

Sprayer booms are typically mounted to a center frame, which is itself mounted to a chassis or machine frame at the rear. An adjustable linkage is typically employed to permit the center frame to be raised and lowered with respect to the ground. The boom includes a center section, which may be part of the center frame. Side assemblies are attached to the left- and right-hand sides of the center frame in a hinged manner so that the boom, in an operating configuration, extends transversely with respect to the forward direction of travel and, in a transport configuration fold with respect to the center frame to extend longitudinally forward alongside the tank.

Each side assembly typically comprises more than one boom section, wherein adjacent sections are connected by a hinged joint that permits the sections to be folded around an upright hinge axis for moving to and from the transport configuration. Respective hydraulic cylinders connected between adjacent mutually-hinged sections serve to control the folding and deployment thereof.

The length of the overall boom determines the operating width of the sprayer. Driven by economies of scale, there is a growing demand for sprayer manufacturers to produce machines with longer spray booms. Longer booms present an increased likelihood of non-uniform vertical spacing between the nozzles and the target (ground or crop) due to undulations of the ground or crop canopy. An even spray pattern and application of the correct rate requires a constant vertical spacing across the operating width of the boom.

To address the problems caused by uneven boom height it has been proposed to provide a 'tilting' freedom of movement between adjacent boom sections, the tilting being pivoting movement around a longitudinal axis, that is an axis parallel with the direction of travel, the tilting being controlled by 'tilt' actuators and enabled by suitable hinged joints. In addition 'roll' of the center frame may also be permitted by suspension from a support frame with a ball joint or other suitable joint, the roll being around a longitudinal axis and being actively controlled by a dedicated roll actuator.

Adjustment of the height of various portions of the boom may thus be made through raising and lowering of the center frame, rolling of the center frame, and tilting of the respective boom sections during operation.

It is known to provide sensors along the working width of the boom to sense the boom height at various locations with respect to the target below. It is also known to provide automatic boom height control wherein a controller is configured to minimize an error value (between a target height and a sensed height). In effect, the 'shape' of the boom is adjusted during operation to closer match the profile of the target below. US Patent Application Publication 2014/0074360, "Predictive Boom Shape Adjustment," published Mar. 13, 2014, discloses an example of an automatic boom height control system that utilizes both boom mounted sensors and a look-ahead module.

BRIEF SUMMARY

In some embodiments, a boom height control system for an agricultural crop sprayer comprises a spray boom, an actuator configured to adjust a position of at least a portion of the spray boom in response to a position adjustment command, a speed sensor configured to measure a forward speed of the sprayer and generate a speed value representative of the forward speed, a position sensor configured to measure a current position of the portion of the spray boom and generate a current position value representative of the current position, and a controller in communication with the speed sensor, the position sensor and the actuator. The controller is configured to generate the position adjustment command based upon a target position value, a current position value, and a speed value.

The position adjustment command is based at least in part upon the forward speed of the sprayer. Advantageously, the position adjustments to the boom or boom sections can be made in a more or less aggressive manner to suit a current speed. For example, within a given speed range it may be determined that a more aggressive adjustment is appropriate.

In one embodiment, the controller uses proportional integral derivative (PID) control to generate the position adjustment command, wherein the selected P-gain value and/or D-gain are dependent upon the current speed. In one embodiment, higher P-gain and D-gain values are chosen so that the adjustments are more aggressive. An increase in P-gain value causes the system to react faster to disturbances, a result of which is an increased likelihood of overshoot which is catered for with an increase in the D-value also. The proportional and derivative components of PID control of the boom are equivalent to the spring and damper constants in a mechanical boom position control system. In other words, varying of the P- and D-gain components in an electro-mechanical control system is akin to varying the spring and damper constants. By selecting the P-gain and D-gain values based upon speed, the aggressiveness of the boom position adjustment is tailored to the current operating conditions.

A numerical relationship between the P-gain values and speed is preferably stored by the system and retrieved by the controller. The same applies to the D-gain values. The relationships may be stored as a lookup table or a graph of gain value vs. speed. In one embodiment, the P- and D-gain values may be stored for each of a set of sample speed values, wherein a linearly-interpolated plot is generated and stored for speed values between the sample speed values. P- and D-gain values for speed values beyond the interpolated plot may be derived from an extrapolated plot.

In one embodiment, the system is alternatively operable in a selected one of a plurality of surface response modes, wherein the controller is operable to select the at least one of a P-gain value and a D-gain value based upon a currently-selected surface response mode. The surface response modes preferably represent a given condition or characteristic of the field over which the sprayer is operating. For example, the surface response mode may take account of the state of the track or 'tramline' over which the sprayer is driven, whether that be even or bumpy. The surface response mode may take account of the general qualitative topography of the field in which the sprayer is operating, whether that be flat or undulating.

An aspect of the invention involves the recognition that the aggressiveness by which boom position adjustments are made can be tailored to suit the surface over which the sprayer operates, and that may include the track condition and/or a characteristic of the field topography. Advantageously, this can be achieved by basing the P-gain and/or D-gain values on a selected surface response mode.

The controller may be configured to store at least one of a P-gain numerical relationship with respect to speed, and a D-gain numerical relationship with respect to speed, for each of the plurality of surface response modes.

The surface response mode may be selected manually by a user using a user interface device, such as an operator terminal with a touchscreen display for example. Alternatively, the surface response mode may be selected automatically, wherein one or more sensors detect the state of the field in which the sprayer is operating, the detected state being communicated to the controller. Alternatively, the controller may utilize a stored topography map to determine the most suitable surface response mode for selection.

In another embodiment, a method of controlling a crop sprayer boom comprises sensing a forward speed of an agricultural crop sprayer and generating a speed value therefrom; receiving a target position value and a current position value in respect of a portion of a sprayer boom mounted to the agricultural crop sprayer; generating a position adjustment command based upon the target position value, the current position value, and the speed value; and adjusting the position of at least a portion the sprayer boom according to the position adjustment command.

In another embodiment, a boom height control system for an agricultural crop sprayer comprises a spray boom, an actuator configured to adjust a position of at least a portion of the spray boom in response to a position adjustment command, a position sensor configured to measure a current position of the portion of the spray boom and generate a current position value representative of the current position, and a controller in communication with the position sensor and the actuator. The system is alternatively operable in a selected one of a plurality of surface response modes, wherein the controller is operable to select at least one of a proportional (P-) gain value and a derivative (D-) gain value based upon a currently-selected surface response mode and generate the position adjustment command based on the selected at least one proportional gain value and derivative gain value using proportional integral derivative (PID) control.

In yet another embodiment, a method of controlling a crop sprayer boom comprises selecting a surface response mode; receiving a target position value and a current position value in respect of a portion of a sprayer boom mounted to the agricultural crop sprayer; generating a position adjustment command based upon the target position value, the current position value, and the selected surface response mode; and adjusting the position of at least a portion the sprayer boom according to the position adjustment command.

BRIEF DESCRIPTION OF THE DRAWINGS

Further advantages will become apparent from reading the following description of specific embodiments in which.

DETAILED DESCRIPTION

While the disclosure will be described in connection with these drawings, there is no intent to limit to the embodiment or embodiments disclosed herein. Although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications, and equivalents included within the scope of the disclosure as defined by the appended claims. Further, it should be appreciated in the context of the present disclosure that the claims are not necessarily limited to the particular embodiments set out in the description.

Figure 1:
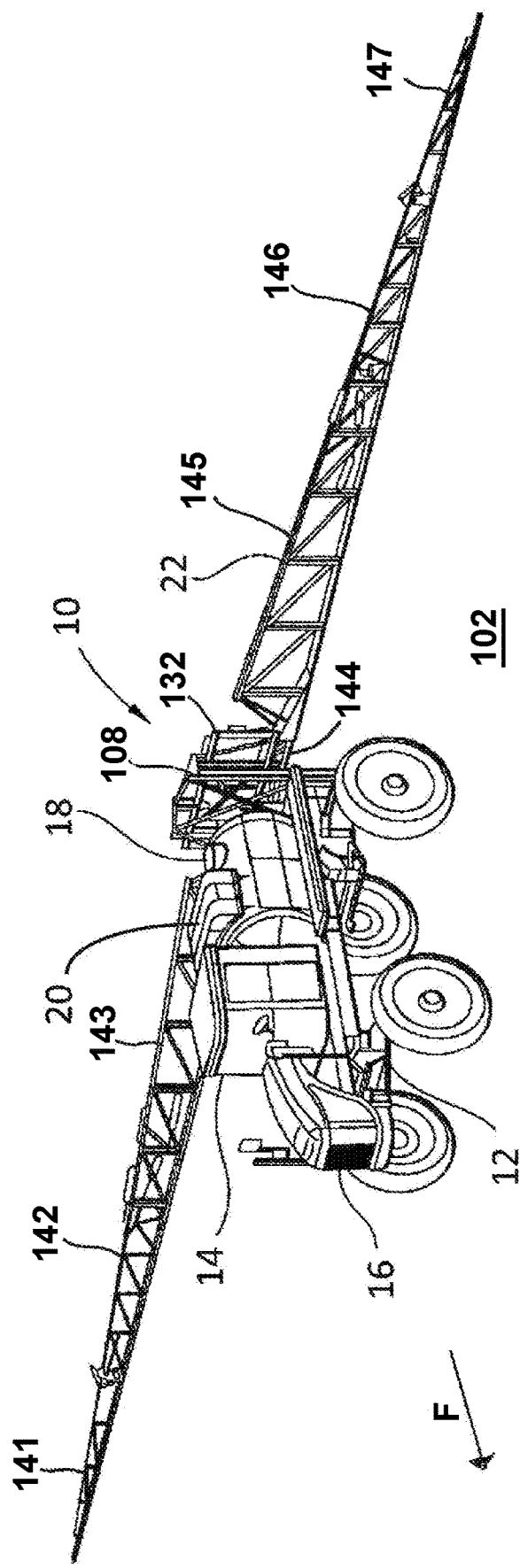
FIG. 1 shows a perspective view of a self-propelled agricultural crop sprayer suitable for embodying a boom height control system.

Turning to the figures, wherein like numbers represent like elements throughout the several views, FIG. 1 shows a self-propelled agricultural crop sprayer 10 comprising a wheeled chassis 12. A cab 14 is mounted on the chassis 12 and equipped with an electronic control unit, hereinafter referenced 'controller 120' and user terminal 170 (shown in FIG. 3). A multi-section sprayer boom 22 extends transversely with respect to a forward direction of travel F and is suspended from a boom support frame 132, which is itself mounted to the sprayer chassis 12 by a height-adjustable linkage 108.

The sprayer 10 further comprises a storage tank 20 carried on the chassis 12 and having a filling point 18. A fluid delivery network (not shown) serves to deliver chemical solution from the storage tank 20 to dispensing nozzles 24 in a known manner.

Although illustrated as a self-propelled sprayer, it should be understood that the disclosure can be applied to other types of agricultural crop sprayers including pull-type 'trailed' sprayers and those adapted for mounting on a three-point linkage of an agricultural tractor.

The height-adjustable linkage 108 in the illustrated embodiment is of a known construction and comprises a pair of spaced vertical rails fixed to the chassis 12 and upon which the boom support frame 132 is slideably mounted for height adjustment thereof. In an alternative embodiment, (not illustrated) the boom support frame is instead mounted to the chassis by a four-bar parallel link arrangement, which permits raising and lowering of the boom with respect to the chassis.

A hoist actuator 181 (shown in FIG. 3) in the form of a hydraulic cylinder for example, is configured to raise and lower the boom support frame with respect to the chassis 12.

The boom 22 comprises a plurality of hinged sections 141-147 that can be manipulated while navigating the field 102. A boom control unit (BCU) 131 is mounted to a center section 144 of the boom 22 and can control operation and manipulation of the boom 22 during operation. In terms of functionality, the BCU 131 may be considered as part of the controller 120. However, it should be appreciated that the BCU 131 may be a separate hardware component located remote from the cab 14 or omitted altogether, in which transducing software associated with the sensors and actuator valves may be integrated in the controller 120.

The center section 144 is suspended from the boom support frame 132 by a ball joint 150 that permits roll adjustment of the center section 144 with respect to the boom support frame 132. A roll actuator 182 (shown in FIG. 3) is configured to control the roll adjustment of the center section 144 with respect to the boom support frame 132.

The spray boom 22 further comprises a pair of side assemblies that are each pivotably mounted to the center section 144 by respective joints that each permit tilt adjustment around an axis parallel to a forward direction of travel. A left side assembly comprises a left inner section 145, a left intermediate section 146, and a left tip section 147. A right side assembly comprises a right inner section 143, a right intermediate section 142, and a right tip section 141. Adjacent boom sections are movably connected to one another, and are pivotable about respective boom pivot points 151-154 shown schematically in FIG. 2.

The boom sections 141-147 can be rolled or tilted by actuators that can comprise hydraulic cylinders controlled hydraulically by hydraulic valves. For example hydraulic cylinders may be positioned at or near the boom pivot points, the pivot points 151-154 characterized by the location of a boom pivot pin, to allow the sections of the boom to be manipulated.

Figure 2:
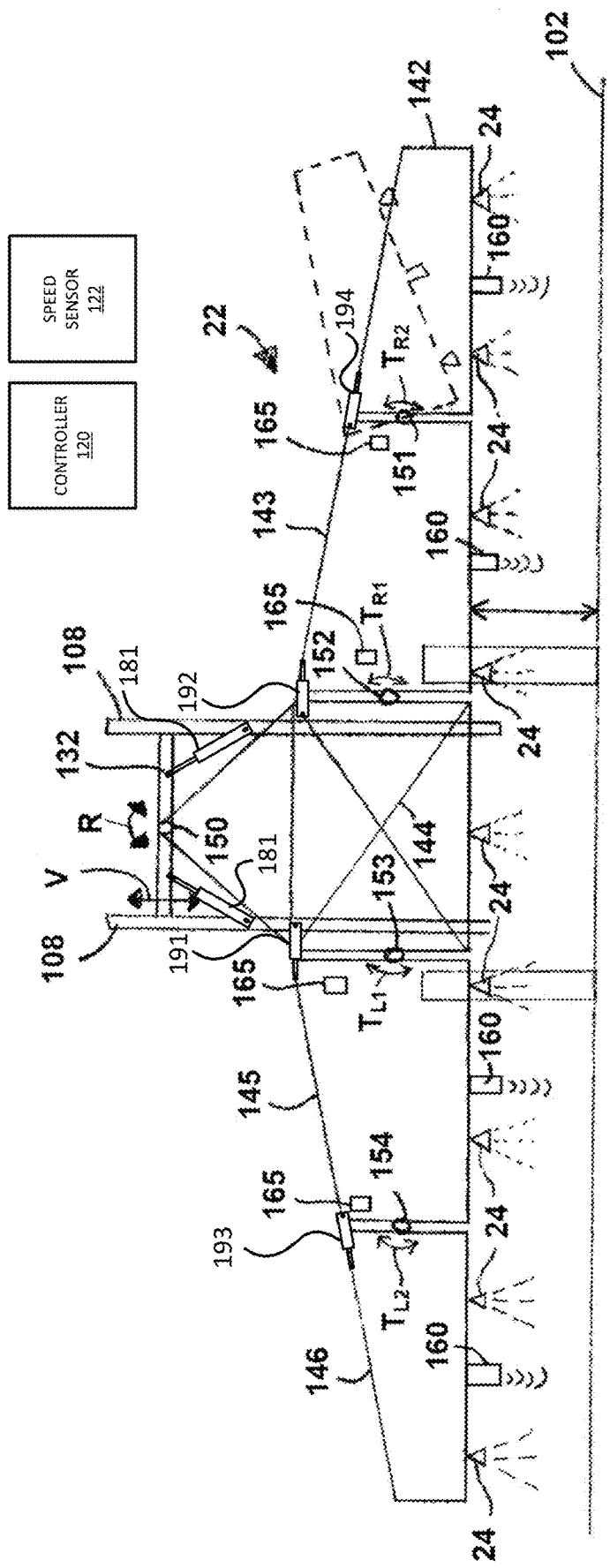
FIG. 2 shows a rear schematic view a crop sprayer having a boom height control system.

FIG. 2 shows a schematic illustration of a multi-section boom 22. However, it should be appreciated that the tip sections 141, 147 have been omitted from FIG. 2 and that the tip sections 141, 147 may or may not be provided in alternative embodiments. Where provided, the tip sections 141, 147 may or may not have the freedom to tilt with respect to the intermediate sections 142, 146. In the description below, the intermediate sections 142, 146 will be referenced as 'outer boom sections'.

The freedoms of movement of the boom 22 and portions thereof include the following: the entire boom 22 may be raised and lowered by hoisting of the boom support frame 132 on the vertical rails, this movement being indicated by arrow V and controlled by a hoist cylinder 181; the entire boom 22 may be pivoted or 'rolled' around a pivot point defined by ball joint 150, the roll movement being indicated by arrow R and controlled by a roll cylinder 182; the left inner section 145 may tilt upwardly or downwardly with respect to the center frame 144 about a longitudinal tilt axis indicated schematically at 153 and by arrow $T_{L1}$, the tilt being controlled by tilt actuator 191; the right inner section 143 may tilt upwardly or downwardly with respect to the center frame 144 about a longitudinal tilt axis indicated schematically at 152 and by arrow $T_{R1}$, the tilt being controlled by tilt actuator 192; the left outer section 146 may tilt upwardly or downwardly with respect to the left inner section 145 about a longitudinal tilt axis indicated schematically at 154 and by arrow $T_{L2}$, the tilt being controlled by tilt actuator 193; the right outer section 142 may tilt upwardly or downwardly with respect to the right inner section 143 about a longitudinal tilt axis indicated schematically at 151 and by arrow $T_{R2}$, the tilt being controlled by tilt actuator 194.

Figure 4:
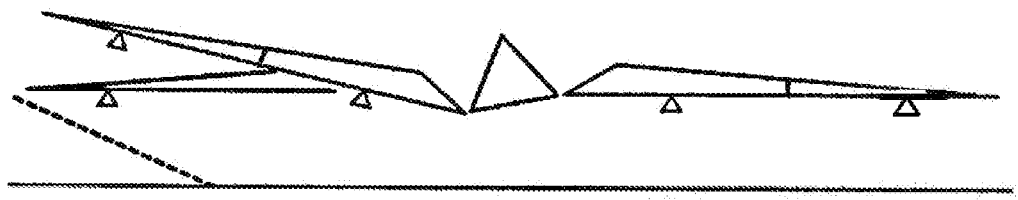
FIG. 4 shows a highly schematic representation of a multi-section spray boom in an example configuration in which a center section is angled.

With reference to FIG. 2, a dashed outline of the right outer section 142 is shown in a tilted upward position for illustrative purposes. Furthermore, FIG. 4 shows schematically an embodiment in which the roll angle of the center frame is adjusted away from level to improve the uniformity of the boom height for the left-hand side assembly as it passes over an undulation.

Although the tilt axes 151-154 are each shown as a single axis, the actual tilt mechanism that provides the hinge action between the adjacent boom sections may comprise a double hinge to permit both upward and downward tilt movement away from the neutral or 'level' position. It should be appreciated that such a double hinge may effectively operate with an upper pivot axis for upward tilt and a lower pivot axis for downward tilt.

Position sensors are mounted on the boom 22 in various locations to sense the position of the boom 22, or portions thereof, relative to the ground 102 or target crop below, and also relative positions of adjacent boom sections 142-146. The position sensors generate current position values which are communicated to the controller 120 via the BCU 131.

Firstly, one or more downwardly directed height sensors 160 (four in the illustrated embodiment) can be positioned on the boom 130 to gauge the height of the boom 130 above the ground 102 or target crop below. The height sensors 160 can comprise ultrasonic sensors having transducer units that convert electrical energy to sound wave pulses and convert resulting ground-reflected sound waves back to electrical energy, measuring the elapsed time between pulses and returned echoes to determine the distance between the boom section and the ground 102. Each height sensor 160 is in electrical communication with the BCU 131. However, height sensors 160 are not limited to ultrasonic sensors but can also be in the form of sensors that use other range-finding techniques as known and practiced in the art. Current position values can be provided to the BCU 131 via a data bus or other wired or wireless communication means. The BCU 130 is communicatively coupled to the computer 220.

In addition to the height sensor(s) 160, one or more displacement sensors 165 can be disposed along the boom 130 width. In an example embodiment, the displacement sensors 165 are each linear sensors configured to determine boom section position by measuring the length or displacement of a hydraulic cylinder associated with movement of a particular boom section. For example, a hydraulic cylinder associated with movement of the inner left section 145 may be attached at or near pivot point 153. The displacement sensor 165 can measure the length of the cylinder to determine the positioning or height change of the boom section 165. Extension of a cylinder is related to the amount of force applied, which can be used to determine the distance the boom is displaced.

Additional sensors such as roll or tilt sensors and the like may also be deployed, although not shown in the drawing. A more distributed control system can be implemented in which various sensor control nodes are arranged along the boom width, each node configured to receive local sensor input and able to communicate that sensor input to the controller 120 via a communications bus.

In an alternative embodiment, the displacement sensors are omitted and positioning of the boom sections is calculated using the output of the height sensors 160. As such a theoretical reconstruction of the boom shape can be determined and used as an input for the controller 120.

Figure 3:
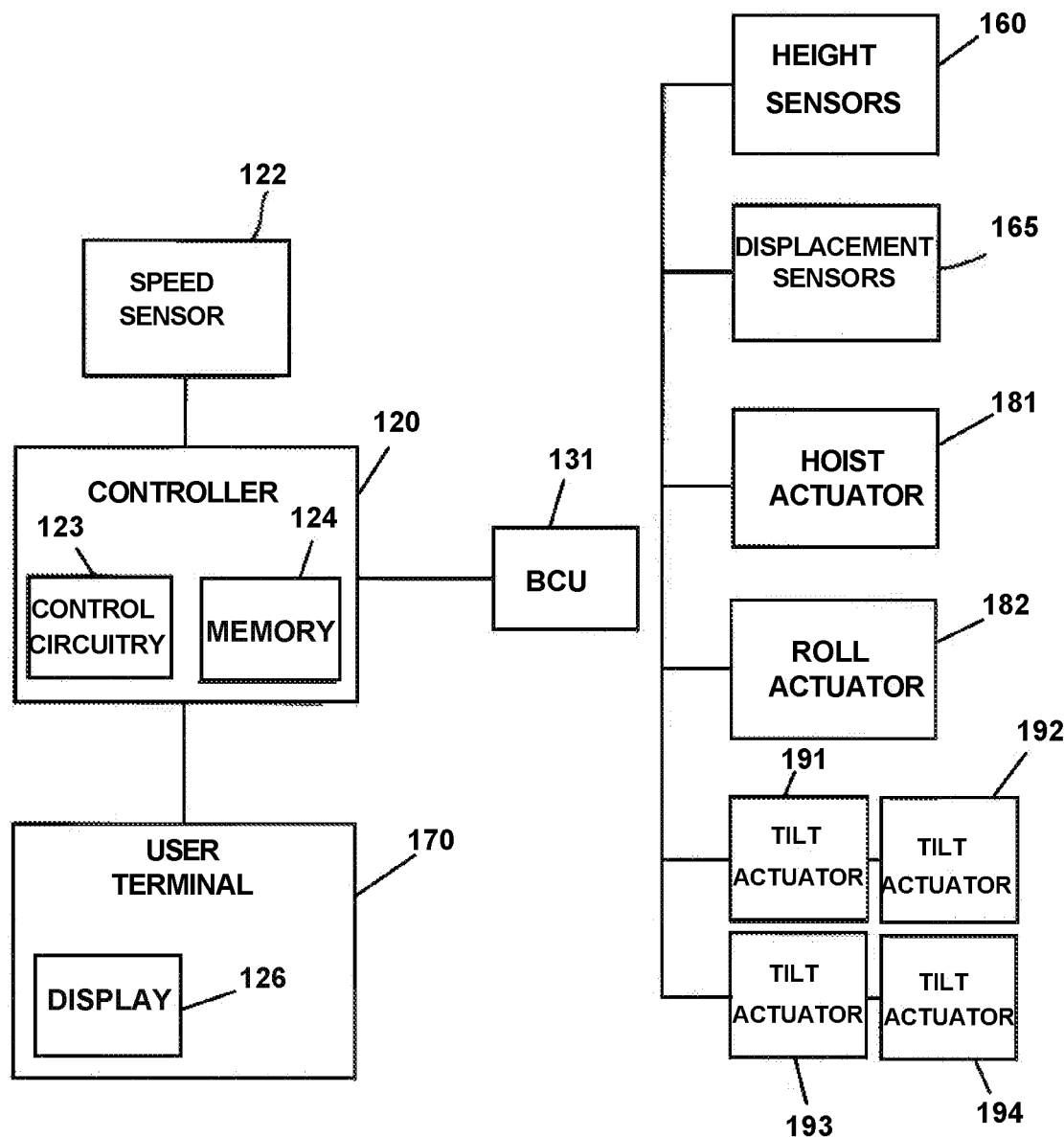
FIG. 3 shows a block diagram of a boom height control system.

With reference to FIG. 3, the controller 120 is in communication (via a databus) with the user terminal 170, the BCU 131 and a vehicle speed sensor 122. The controller 120 comprises control circuitry 123 which may be embodied as custom made or commercially available processor, a central processing unit or an auxiliary processor among several processors, a semi-conductor based micro-processor (in the form of a micro-chip), a macro processor, one or more applications-specific integrated circuits, a plurality of suitably configured digital logic gates, and/or other well-known electrical configurations comprising discrete elements both individually and in various combinations to coordinate the overall operation of the sprayer 10.

The speed sensor 122 may be a standalone sensor that generates a speed value or signal representative of the forward speed of the sprayer 10. Alternatively, the speed sensor 122 may be embodied in a satellite positioning system (not shown) which generates a speed value based on vehicle positioning data in real time.

The controller 120 further comprises memory 124. The memory 124 may include any one of a combination of volatile memory elements and non-volatile memory elements. The memory 124 may store a native operating system, one or more native applications, emulation systems, emulated applications for any of a variety of operating systems and/or emulated hardware platforms, emulated operating systems, etc. The memory 124 may be separate from the controller 120 or may be omitted.

The user terminal 170 comprises a display 126, which may be integrated as part of a terminal having user interface devices such as buttons, levers, and switches. The terminal 170 is mounted proximate to a drivers work station in the cab 14.

The height sensors 160 and displacement sensors 165 are coupled to the BCU 131, which provides current position values as an input to the controller 120. Furthermore, the hoist actuator 181, roll actuator 182, and tilt actuators 191-194 are connected to the BCU 131. It should be understood that the actuators as described include both the electro-mechanical valves which are electrically connected to the controller 120 (optionally via the BCU 131), and the hydraulic cylinders which are actuated hydraulically by the valves. It should be appreciated also that alternative forms of actuator can be utilized for controlling the tilt, roll, and lift of the boom sections, including electric actuators.

In some embodiments, the valves controlling the tilt actuators 191-194 are proportional valves, whereas those valves controlling the hoist actuator 181 and roll actuator 182 may be proportional valves or simply open/close valves. The proportional valves are controlled by PWM outputs from the BCU 131, which allows a proportional control in a continuous range between minimum and maximum hydraulic flow.

The controller 120 controls the boom height and the aggressiveness by which the tilt actuators 191-194 are controlled in different operating conditions. In one embodiment, the position adjustment commands generated by the controller, and particularly the aggressiveness of the commanded adjustment is made dependent upon forward speed. In another embodiment, the position adjustment commands generated by the controller, and particularly the aggressiveness of the commanded adjustment is made dependent upon the terrain over which the sprayer is operating. One or both of speed and terrain may be used as input parameters for the determination of the position adjustment commands.

Speed-Dependent PID Boom Tilt Control

The controller 120 uses proportional-integral-derivative (PID) gain to determine position adjustment commands for the tilt actuators during operation. In particular, in one embodiment, proportional gain (hereinafter referenced P-gain) and derivative gain (hereinafter referenced D-gain) values are made dependent upon a speed value received from the speed sensor 122.

The controller 120 executes an algorithm to determine the position adjustment commands, the algorithm having as inputs a target position value, a current position value, and a speed value.

For each tilt actuator, the target position value is representative of a target angle between the outermost boom section connected to the actuator and the ground or target crop canopy. Alternatively, the target position value is representative of a target angle between adjacent pairs of boom sections. During normal operation, the target angle is typically zero. In a headland mode, the target angle may have a positive value, which the user can program into the controller through the user terminal 170.

A target positon value for a boom section or tilt actuator may also depend upon a target position value of another boom section, tilt actuator, or roll actuator. This can be understood when considering that rolling of the center section, for example, has an effect on the angle of all boom sections, and as such on the target position values thereof.

Current position values are communicated from the displacement sensors 165 to the controller 120. The speed values are communicated from the speed sensor 122 to the controller 120. The speed values determine P-gain and D-gain values, forming inputs to the algorithm.

Figure 7:
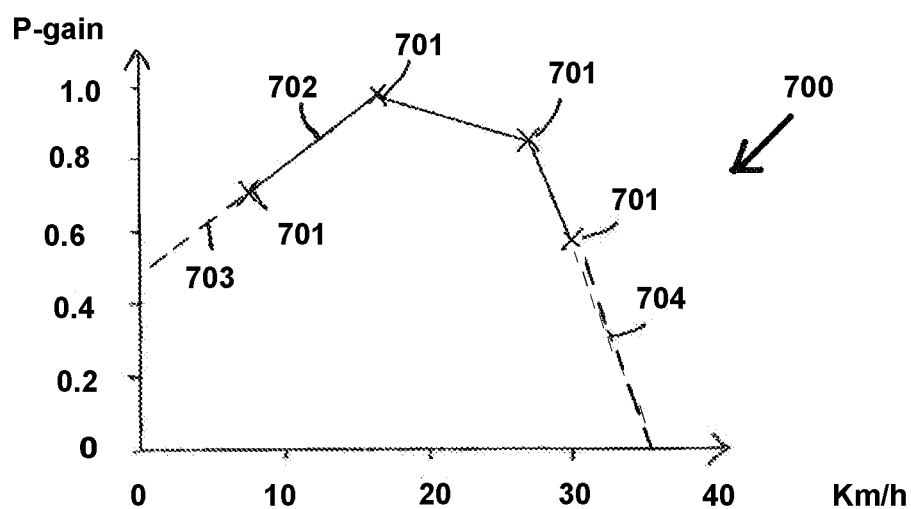
FIG. 7 is a graph showing a relationship of P-gain values against forward speed, stored and utilized.

The controller 120 stores in the memory 124 a P-gain relationship with respect to forward speed v. In one embodiment, the relationship is stored as a graph in which a set of sample points are joined by an interpolated plot as illustrated in FIG. 7. The sample points 701 can be programmed by a manufacturer and may be based upon observations of the boom 22 carried out at different forward speeds. The controller 120 may then generate the interpolated plot 702 between the sample points 701. The graph 700 may also include extrapolated plots 703, 704 beyond the minimum and maximum sample points.

Although illustrated as a graph, the relationship may in practice be stored as an algorithm or a lookup table, which enables the controller 120 to determine a P-gain value based upon a current speed value v.

The controller 120 also stores in the memory a D-gain relationship with respect to forward speed v, in a similar manner to that described above.

The controller 120 is operable to derive the P-gain value and the D-gain value from the stored relationships and a current speed value. The retrieved P-gain value and D-gain value are utilized in the algorithm to determine position adjustment commands for the tilt actuators. The algorithm executed by the controller 120 is a PID-based algorithm. The P-gain causes the position adjustment value output to increase with increasing error (target position value minus current position value). This aspect can be regarded as a physical spring between a target position and a current position; the further away from the target position the stronger the system will be pulled back to the target position. The P-gain component of the algorithm can be considered as a spring in an equivalent mechanical system.

The D-gain value causes the position adjustment value output to decrease faster if the current position value is rapidly moving towards the target position to avoid or reduce overshoot. The D-gain component of the algorithm can be considered as a damper in an equivalent mechanical system.

The P-gain and D-gain values are updated at regular intervals, for example at one-second intervals.

Terrain-Dependent PID Boom Tilt Control

In another embodiment, P-gain and D-gain values are made dependent upon a selected one of a plurality of surface response modes, wherein the P-gain and D-gain values serve as inputs to an algorithm executed by the controller 120 to determine position adjustment commands for the tilt actuators 191-194. The surface response modes may be selected manually by an operator using the user terminal 170.

Figure 5:
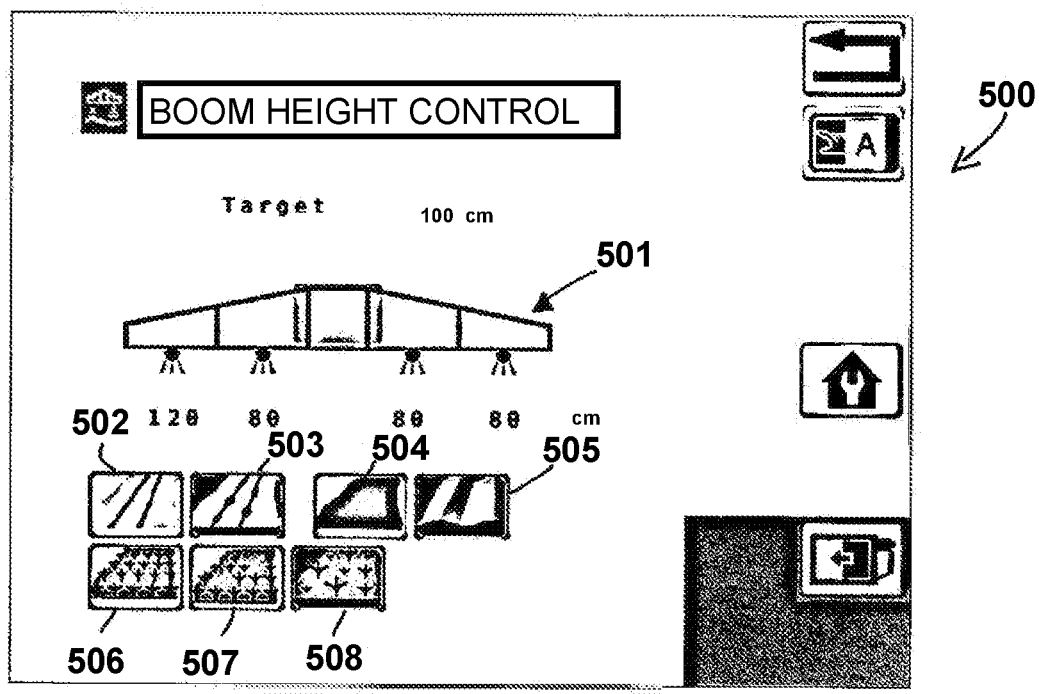
FIG. 5 shows an example user interface terminal display which forms part of a boom height control system.
Figure 6:
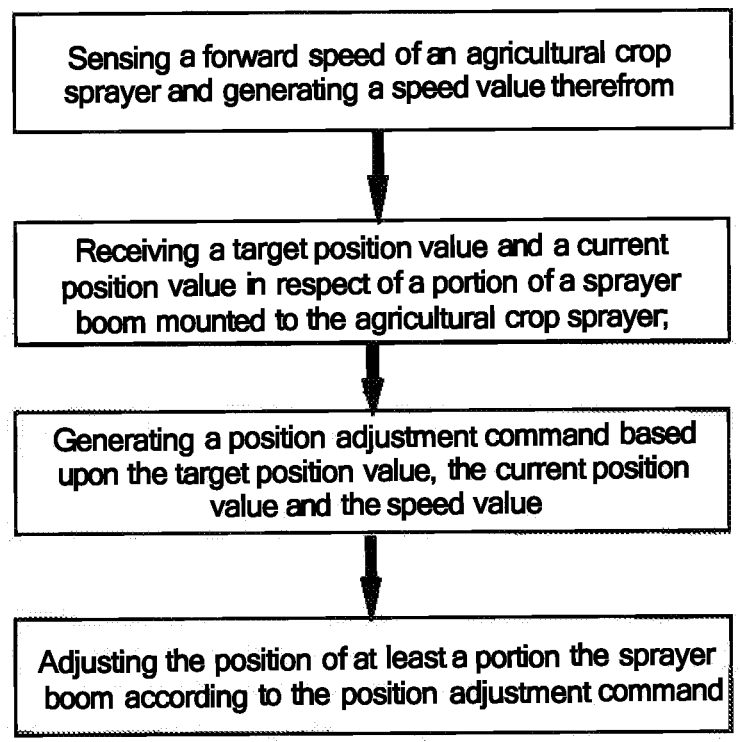
FIG. 6 is a process flow diagram.

FIG. 5 shows an example user menu 500 displayed on the display 126, wherein the user can select different aspects forming a surface response mode. There are two types of surface response mode: those related to terrain and those related to the target crop.

A first terrain-based surface response mode relates to the condition of the track or tramline. Alternative options 'Even track' and 'Bumpy track' can be selected by operating displayed buttons 502, 503 respectively, each button having a graphic to represent an even track or a bumpy track and allowing the algorithm to take account of the state of the track or 'tramlines' over which the sprayer 10 is operating.

A second terrain-based surface response mode relates to the general topography of the field in which the sprayer is operating. Alternative options 'Flat field' and 'Hilly field' can be selected by operating displayed buttons 504, 505 respectively, each button having a graphic to represent a flat field or a hilly/undulating field and allowing the algorithm to take account of the general topography of the field in which the sprayer 10 is operating.

One of four surface response mode combinations is thus determined from the combination of selections made for the track and field condition—that is, one of even/flat, even/hilly, bumpy/flat, and bumpy/hilly. For each surface response mode, different P-gain and D-gain values are stored and retrieved in the execution of the algorithm that determines the position adjustment commands.

In a preferred embodiment, the P-gain and D-gain values depend on both the selected terrain-based surface response mode combination and the speed, wherein the controller 120 is configured to store both a P-gain relationship with respect to speed, and a D-gain relationship with respect to speed, for each of the available terrain-based surface response mode combinations.

A crop-based surface response mode relates to the state of the target crop over which the sprayer is operating. Alternative options 'Flat crop', 'Holes in crop' and 'Scattered crop' can be selected by operating displayed buttons 506, 507, 508 respectively, each button having a graphic to represent a flat crop, a crop with gaps or holes, and a scattered crop, and allowing the algorithm to take account of the state of the crop.

For different crop modes, there are different sensor filter parameter settings. For example, if there are holes in the crop the sensor signal, filtering is adjusted in such a manner that the controller 120 sees these holes in a delayed and less abrupt manner, which avoids the boom diving into these holes.

In an alternative embodiment, the controller 120 is configured to automatically select a surface response mode dependent upon a terrain input signal, which may take an input from suspension cylinders of the sprayer 10 or a LIDAR sensor mounted to the sprayer 10 and arranged to detect the surrounding topography and/or crop state.

Although the above-described embodiments aim to adapt the aggressiveness of the tilt actuator control in dependence on speed and/or terrain, the control system can be applied to control of the hoist actuator 181 and roll actuator 182 instead or in addition, wherein the control valves associated with actuators are proportional control valves suitable for PID control.

From reading the present disclosure, other modification will be apparent to persons skilled in the art. Such modifications may involve other features which are already known in the field of boom height control systems and component parts thereof, and which may be used instead of or in addition to features already described herein.

The invention claimed is:

1. A boom height control system for an agricultural crop sprayer, the system comprising:
   a spray boom;
   an actuator located on the spray boom and configured to adjust a position of at least a portion of the spray boom in response to a position adjustment command;
   a speed sensor configured to measure a forward speed of the agricultural crop sprayer and generate a speed value representative of the forward speed;
   a position sensor configured to measure a current position of the portion of the spray boom and generate a current position value representative of the current position; and
   a controller comprising an electronic control unit in communication with the speed sensor, the position sensor, and the actuator, wherein the controller is configured to generate the position adjustment command based upon a target position value, the current position value, and the speed;
   wherein the controller is operable to select at least one of a proportional gain value and a derivative gain value based upon the speed value, and generate the position adjustment command based on the selected at least one proportional gain value and derivative gain value using proportional integral derivative control.

2. The boom height control system of claim 1, wherein the controller is configured to store at least one of a proportional gain relationship with respect to speed, and a derivative gain relationship with respect to speed, wherein the controller is operable to derive the at least one proportional gain value and the derivative gain value from the stored at least one of proportional gain relationship and the derivative gain relationship.

3. The boom height control system of claim 2, wherein the proportional gain relationship comprises a set of pre-defined proportional gain values for a plurality of speed values, and a linearly-interpolated plot between the set of pre-defined proportional gain values.

4. The boom height control system of claim 2, wherein the derivative gain relationship comprises a set of pre-defined derivative gain values for a plurality of speed values, and a linearly-interpolated plot between the set of pre-defined derivative gain values.

5. The boom height control system of claim 1, wherein the boom height control system is alternatively operable in a selected one of a plurality of surface response modes, wherein the controller is operable to select the at least one of a proportional gain value and a derivative gain value based upon a currently selected surface response mode.

6. The boom height control system of claim 5, wherein the controller is configured to store at least one of a proportional gain relationship with respect to speed, and a derivative gain relationship with respect to speed, for each of the plurality of surface response modes.

7. The boom height control system of claim 5, further comprising a user interface in communication with the controller, wherein the plurality of surface response modes are selectable by a user via the user interface.

8. The boom height control system of claim 5, wherein the controller is configured to automatically select one of the plurality of surface response modes in response to a terrain input signal.

9. The boom height control system of claim 1, wherein the spray boom comprises a center section and a pair of side assemblies that are each pivotably mounted to the center section by respective joints that each permit tilt adjustment around an axis parallel to a forward direction of travel, wherein the boom height control system further comprises tilt actuators configured to control tilt of each side assembly with respect to the center frame in response to position adjustment commands, wherein the controller is in communication with each tilt actuator.

10. The boom height control system of claim 9, wherein each side assembly comprises an inner boom section pivotably mounted at an inner end to the center section by an inner tilt joint, and an outer boom section pivotably mounted at an inner end to an outer end of the inner boom section by an outer tilt joint, wherein each side assembly has connected thereto an inner tilt actuator configured to control tilt of the inner boom section with respect to the center section, and an outer tilt actuator configured to control tilt of the outer boom section with respect to the inner boom section.

11. The boom height control system of claim 9, wherein the center section is suspended from a boom support frame by a joint that permits roll adjustment of the center section with respect to the boom support frame, and further comprising a roll actuator configured to control the roll adjustment.

12. The boom height control system of claim 11, wherein the boom support frame is mounted to a wheeled vehicle frame by a height-adjustable linkage, and wherein the boom height control system further comprises a boom height actuator coupled to the height-adjustable linkage and configured to control height adjustment of the boom support frame.

13. A method of controlling a crop sprayer boom, the method comprising:
   sensing a forward speed of an agricultural crop sprayer and generating a speed value therefrom;
   receiving a target position value and a current position value in respect of a portion of a sprayer boom mounted to the agricultural crop sprayer;
   generating a position adjustment command based upon the target position value, the current position value, and the speed value;
   adjusting the position of at least a portion the sprayer boom according to the position adjustment command;
   storing at least one of a proportional gain relationship with respect to speed, and a derivative gain relationship with respect to speed;
   deriving at least one of a proportional gain value and a derivative gain value from the stored proportional gain relationship and derivative gain relationship; and
   generating the position adjustment command based on the derived at least one proportional gain value and derivative gain value using proportional integral derivative control.

14. A boom height control system for an agricultural crop sprayer, the system comprising:
   a spray boom;
   an actuator configured to adjust a position of at least a portion of the spray boom in response to a position adjustment command;
   a position sensor configured to measure a current position of the portion of the spray boom and generate a current position value representative of the current position; and
   a controller comprising an electronic control unit in communication with the position sensor and the actuator;
   wherein the system is alternatively operable in a selected one of a plurality of surface response modes;
   wherein the controller is operable to select at least one of a proportional gain value and a derivative gain value based upon a currently selected surface response mode and generate the position adjustment command based on the selected at least one of the proportional gain value and derivative gain value using proportional integral derivative control.

15. The boom height control system of claim 14, further comprising a user interface in communication with the controller, wherein the one of the plurality of surface response modes is selectable by a user.

16. The boom height control system of claim 14, wherein the controller is configured to automatically select one of the plurality of surface response modes in response to a terrain input signal.

17. The boom height control system of claim 14, wherein the plurality of surface response modes include at least one mode selected from the group consisting of a flat-track mode, a bumpy track mode, a flat field mode, and a hilly field mode.

18. The boom height control system of claim 14, further comprising a speed sensor in communication with the controller and configured to measure a forward speed of the sprayer and generate a speed value representative of the forward speed, wherein the controller is configured to generate the position adjustment command based upon the speed value.

* * * * *